(12) United States Patent
Shastry et al.

(10) Patent No.: US 10,990,624 B1
(45) Date of Patent: Apr. 27, 2021

(54) METHODS AND SYSTEMS FOR DYNAMICALLY PROCESSING MEDIA CONTENT ON TRANSPORTATION VEHICLES

(71) Applicant: Panasonic Avionics Corporation, Lake Forest, CA (US)

(72) Inventors: Shankar Shastry, Irvine, CA (US); Sanjiv Pimple, Irvine, CA (US); Carol Hsieh, Irvine, CA (US)

(73) Assignee: Panasonic Corporation, Lake Forest, CA (US)

( * ) Notice: Subject to any disclaimer, the term of this patent is extended or adjusted under 35 U.S.C. 154(b) by 0 days.

(21) Appl. No.: 16/658,629

(22) Filed: Oct. 21, 2019

(51) Int. Cl.
| | | |
|---|---|---|
| G06F 16/48 | (2019.01) |
| B64D 11/00 | (2006.01) |
| G06F 16/483 | (2019.01) |
| H04L 29/08 | (2006.01) |
| H04B 7/185 | (2006.01) |
| H04N 21/214 | (2011.01) |

(52) U.S. Cl.
CPC ...... *G06F 16/489* (2019.01); *B64D 11/00155* (2014.12); *G06F 16/483* (2019.01); *H04B 7/18508* (2013.01); *H04L 67/12* (2013.01); *H04L 67/325* (2013.01); *H04N 21/2146* (2013.01)

(58) Field of Classification Search
CPC ... H04L 67/325; H04L 67/12; H04N 21/2146; H04B 7/18508; G06F 16/489; G06F 16/483; B64D 11/00155
See application file for complete search history.

(56) References Cited

U.S. PATENT DOCUMENTS

| | | | |
|---|---|---|---|
| 6,810,527 B1 * | 10/2004 | Conrad | H04N 7/163 348/E7.061 |
| 2007/0250901 A1 | 10/2007 | McIntire et al. | |
| 2009/0070841 A1 | 3/2009 | Buga et al. | |
| 2009/0132453 A1 | 5/2009 | Hangartner et al. | |
| 2011/0016486 A1 * | 1/2011 | Morimoto | H04N 21/4334 725/32 |
| 2014/0289759 A1 * | 9/2014 | Nakano | G06Q 30/06 725/31 |

(Continued)

FOREIGN PATENT DOCUMENTS

CN 104484199 4/2015

*Primary Examiner* — John T Repsher, III
(74) *Attorney, Agent, or Firm* — Klein, O'Neill & Singh, LLP

(57) ABSTRACT

Methods and systems are provided for a transportation vehicle. One method includes parsing by a processor on an aircraft, metadata of media content received by the aircraft, while the aircraft is in flight, the media content includes a media file and the metadata. The metadata indicates a start date when the media content can be presented to a device on the aircraft and an end date when media content is to become inaccessible. The method further includes dynamically generating a unique identifier for the media content by the processor, the unique identifier based on an aircraft identifier; updating the metadata by the processor by associating the unique identifier with the media content; storing the media content with the updated metadata and an indicator when the media content is to be deleted; and using the unique identifier by the processor for tracking usage of the media content on the aircraft.

20 Claims, 9 Drawing Sheets

(56) References Cited

U.S. PATENT DOCUMENTS

| | | | |
|---|---|---|---|
| 2016/0127895 A1* | 5/2016 | Bangole | H04W 12/0804 380/279 |
| 2016/0295379 A1* | 10/2016 | Jakatdar | H04L 67/141 |
| 2017/0308962 A1* | 10/2017 | Raskin | G06F 16/3326 |
| 2019/0014371 A1 | 1/2019 | Couleaud et al. | |

* cited by examiner

METHODS AND SYSTEMS FOR DYNAMICALLY PROCESSING MEDIA CONTENT ON TRANSPORTATION VEHICLES

TECHNICAL FIELD

The present disclosure relates to transportation vehicles in general, and more particularly, to processing media content on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

In conventional systems, typically media content loading on transportation vehicles is scheduled. For example, for an aircraft, media content is typically loaded on a monthly basis while the aircraft is on the ground. This operation is referred to as "monthly media loading", when an airline sends media content to an IFE system provider on a monthly basis. The IFE system provider uses a portable media loader to update media content to the aircraft. This conventional approach is inefficient because the airline has to wait for a month to upload media content to the aircraft. The portable media loader also requires technicians to manually load media content, which makes the process labor intensive. Continuous efforts are being made to develop computing technology for making media content available on transportation vehicle at any instance.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
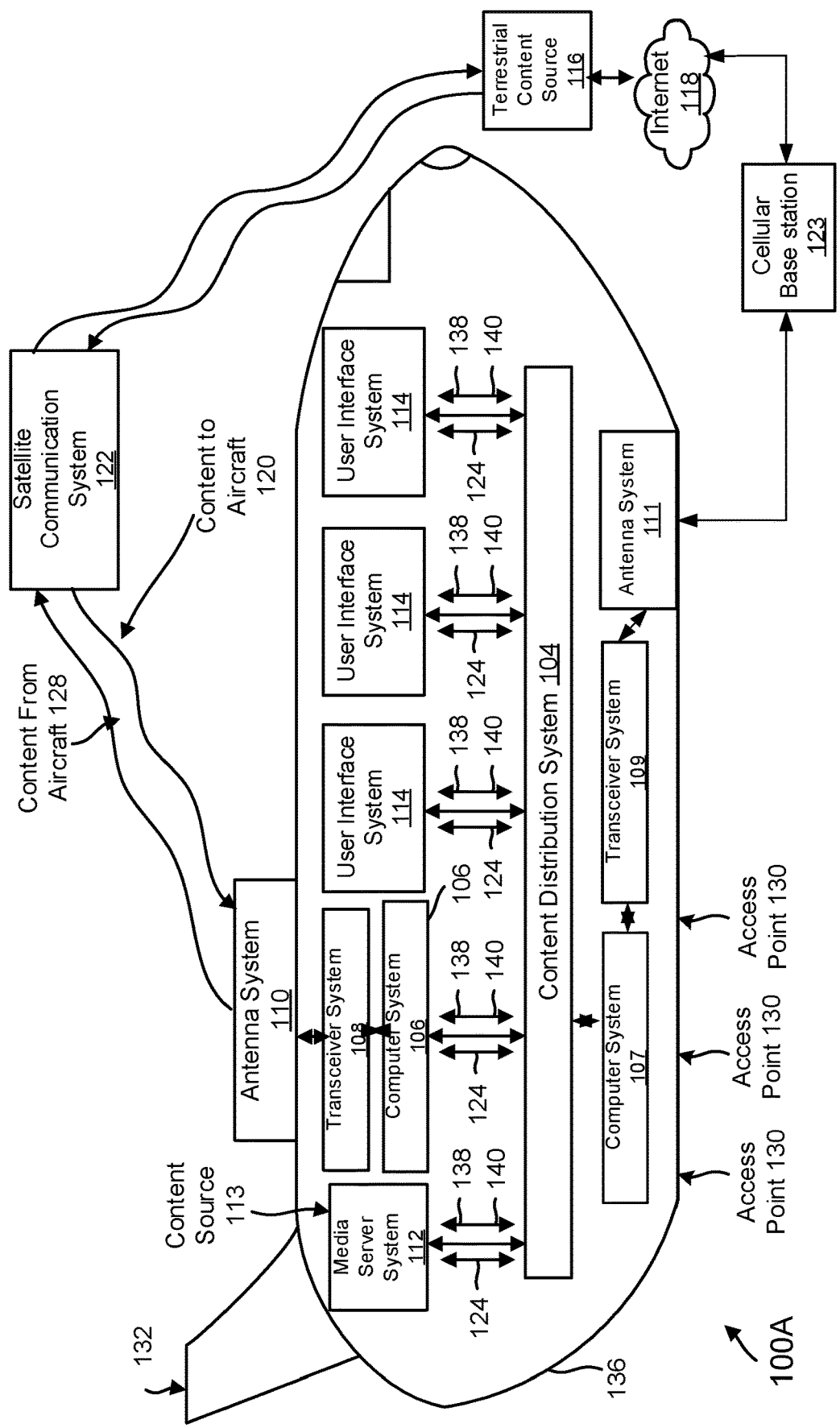
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132, according to one aspect of the present disclosure. In one aspect, as described below in detail, system 100A uses innovative computing technology of the present disclosure for loading media content on an aircraft 132 while the aircraft is airborne and/or when the media content is loaded outside of a scheduled media content loading, e.g. monthly loading of media content. The media content includes audio, video, or any other media type. The technology disclosed herein enables airlines to provide media content via satellite connectivity any time including when the aircraft is in-flight and via wireless connectivity when the aircraft via a cellular base station 123 (e.g., a cell phone tower). The airlines and media providers are not restricted to monthly updates and instead media content is made available for consumption immediately, as described below in detail.

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or the cellular base station 123 that communicates through an antenna 111 to a transceiver system 109, and a computer system 107 (similar to computer system 106). The functionality of computer system 107 is similar to computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a personal electronic device (PED) to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
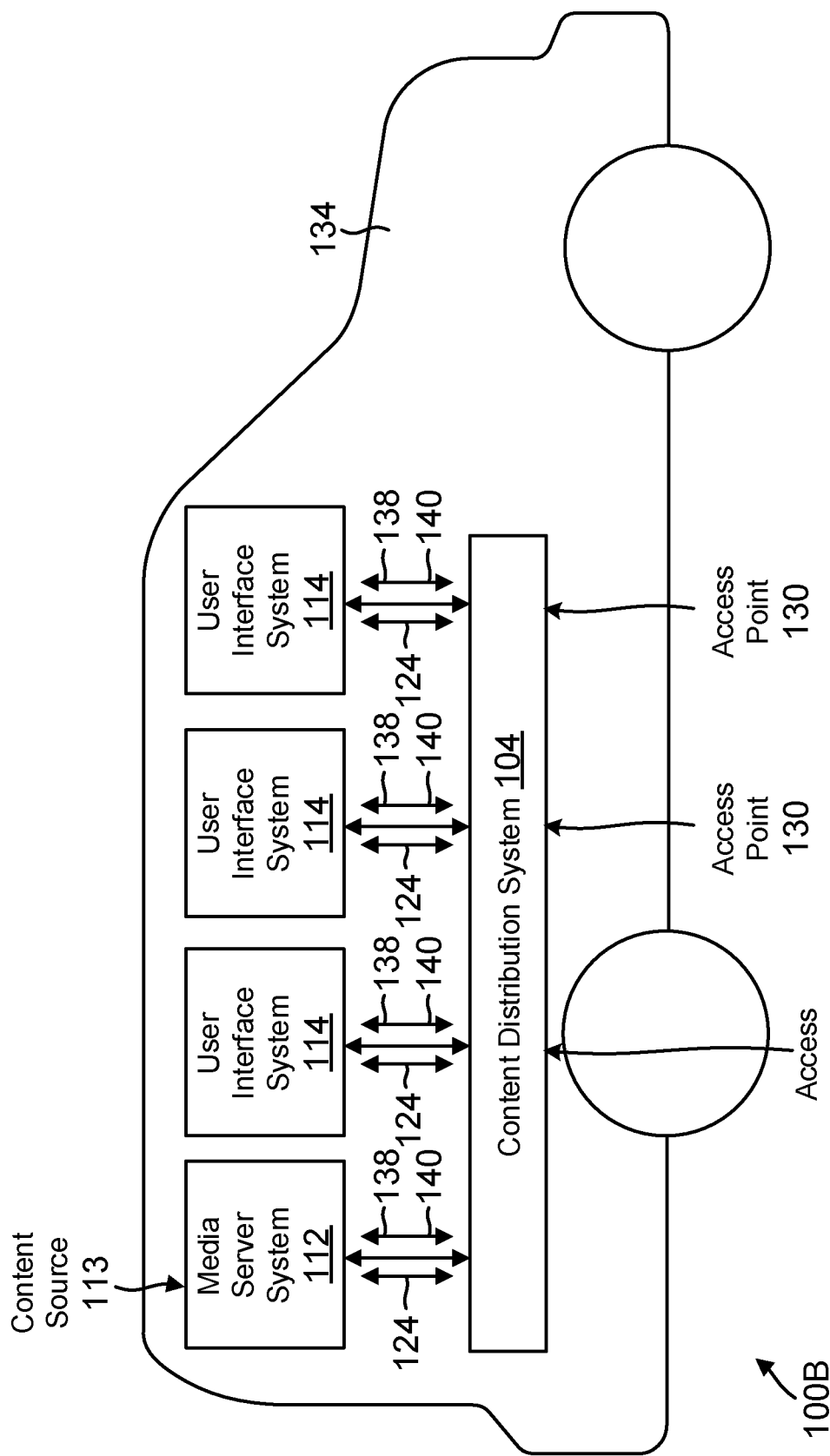
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
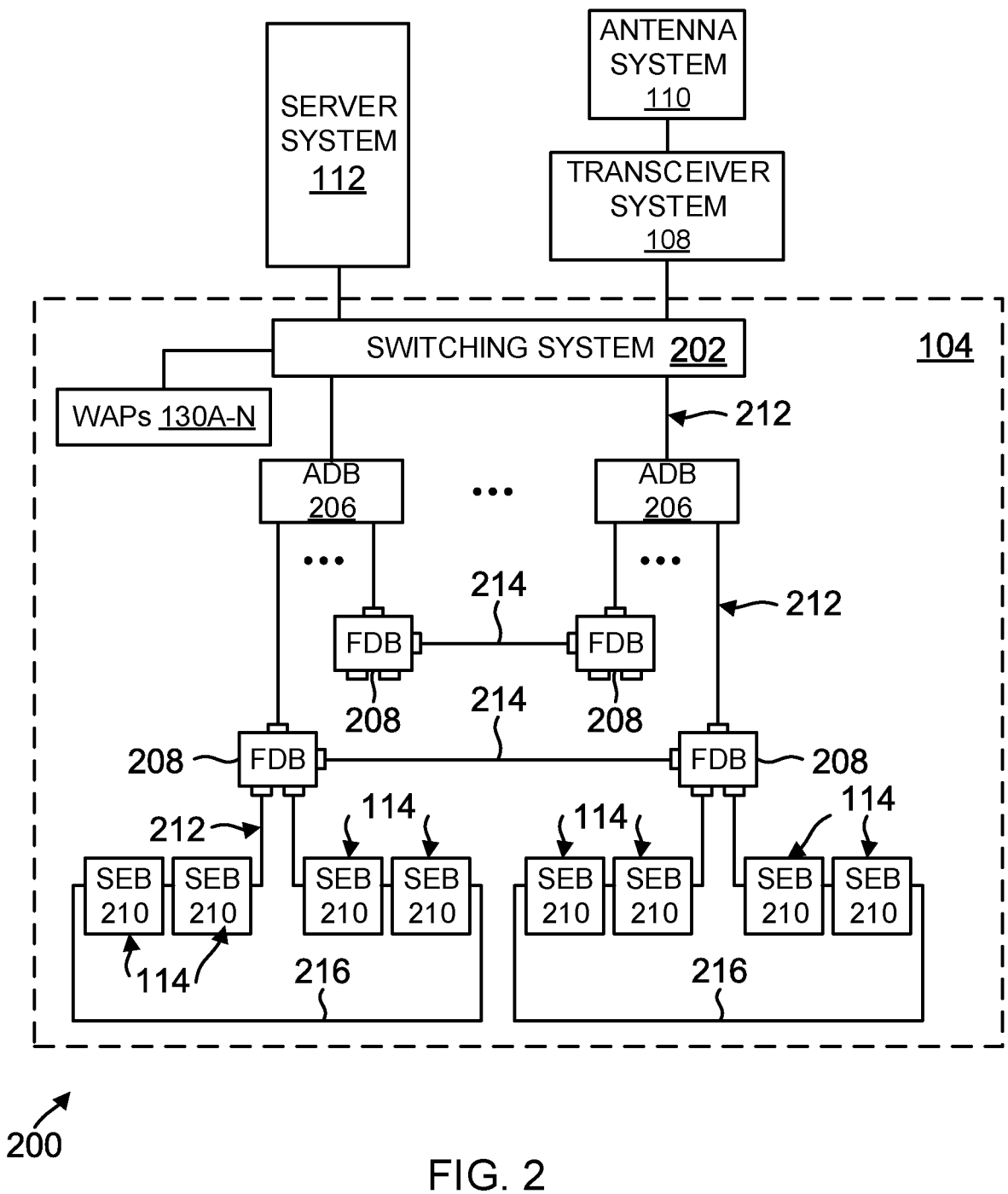
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
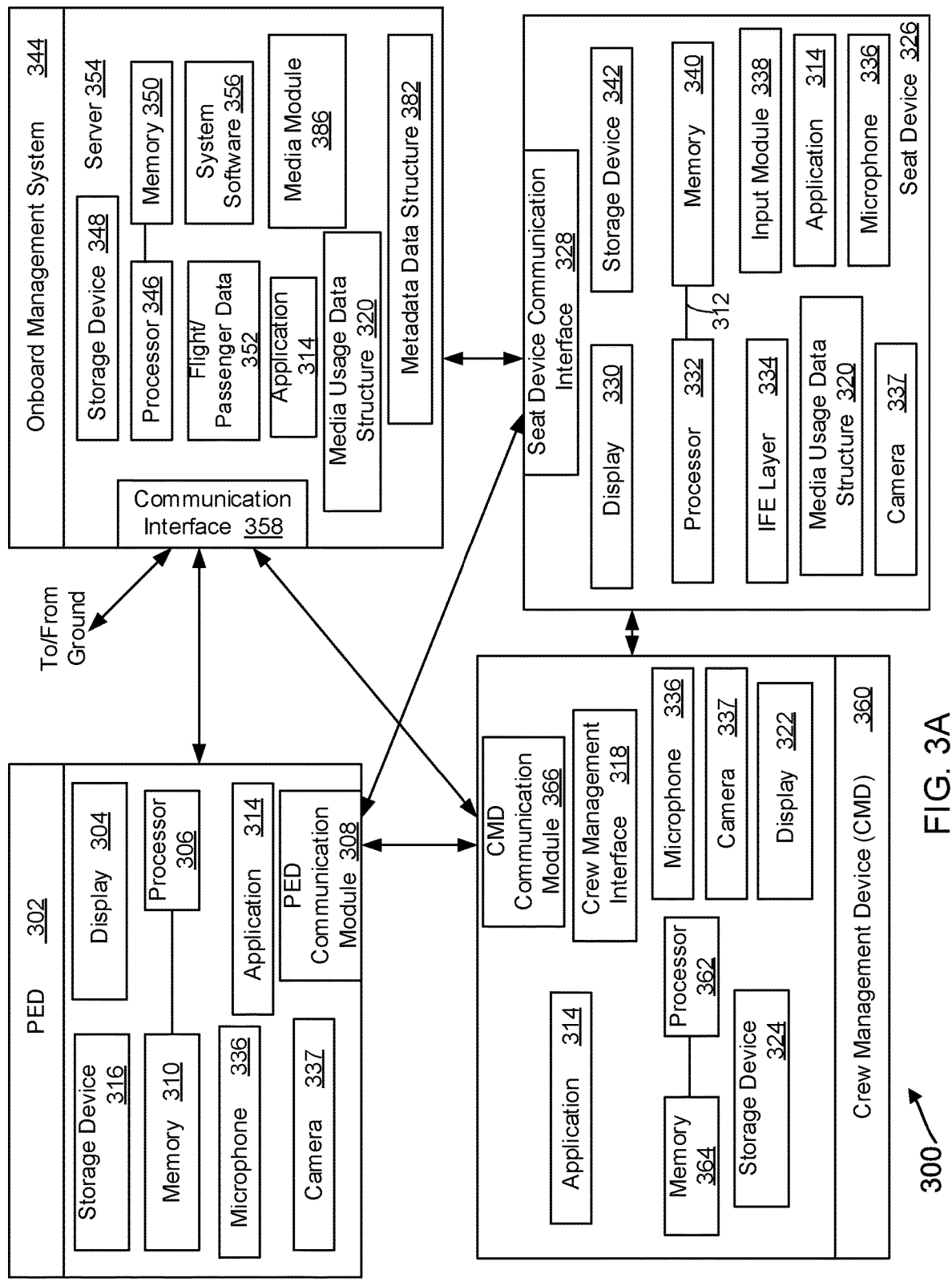
FIG. 3A shows an example of an overall system for distributing information to passengers on an aircraft, according to one aspect of the present disclosure.

System 300:

FIG. 3A shows an example of a system 300 for persistently storing and managing media content received by an aircraft (or any other transportation vehicle) while the aircraft is in-flight and/or outside of scheduled media updates, according to one aspect of the present disclosure. The media content is managed by a media module 386 executed by an onboard management system 344 described below in detail In one aspect, system 300 includes, the onboard management system 344, a seat device 326, a PED 302, and a crew management device (may be referred to as "CMD") 360. In another aspect, system 300 may not include a seat device 326. The onboard management system 344 may be similar to computer system 106 and/or server 112 described above with respect to FIGS. 1A/1B.

In one aspect, the onboard management system 344 includes a server 354 (similar to the media server 112 and/or computer system 106/107). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, media usage data structure 320 (may also be referred to as data structure 320), metadata data structure 382 (may also be referred to as data structure 382), media content or any other information) applications and program files, including system software 356, an application 314, the media module 386 (may also be referred to as module 386) and others. Module 386 manages media content that is loaded on to the aircraft when the aircraft is in flight. Media module 386 maintains the data structure 382 that includes metadata that is received for media content and fields inserted by the media module 386, as described below in detail.

In another aspect, server 354 stores the data structure 320 that includes a usage pattern for media content that is accessed by passengers. In one aspect, the various seat devices 326 provide portions of the data structure 320 and the media module 386 generates the data structure 320 to store the usage pattern. Details of data structure 320 are provided below.

In one aspect, system software 356 is executed by the processor 346 to control the overall operation of the server 354. Application 314 may be downloaded from server 354 by passengers using an authorized PED 302 for accessing digital content.

In one aspect, the onboard management system 344 maintains flight and passenger data 352 (may also be referred to as data 352), for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, and any other information that can uniquely identify the passengers. Data 352 may be retrieved from the ground system (369, FIG. 3B) before flight departure.

In one aspect, server 354 communicates with CMD 360, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, the seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and vides and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device. The seat device 326 may store portions of the media usage data structure 320. The data structure 320 may be used to track media content usage on the seat device 326 as described below in detail.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options to users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 may also execute the application 314 that may be used by the passenger to view media content or various computing functions that are enabled by the seat device 326. The application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc.

The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone 336 for receiving a voice input. CMD 360 may also include a camera 337 for taking pictures or making a video.

The CMD 360 may also include a storage device 324 that may be, or may include any storage medium for storing data in a non-volatile manner, such as one or more magnetic or optical based disks, flash memory, or solid-state drive. The storage device 316 may be used to store a crew management interface (CMI) 318 that may be executed out of memory 364.

The CMI 318 enables the CMD 360 to interface with the onboard management system 344 via a CMD communication module 366. The CMD 360 may present one or more APIs to the management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In one aspect, the PED 302 is paired with the seat device 326. The PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may include a microphone 336 for receiving a voice input from a passenger. The voice input is converted into text by an application 314 for processing. In another aspect, PED 302 also includes a camera 337 that may be used by a passenger to upload a video.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content and communicate with CMD 360.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

Figure 3B:
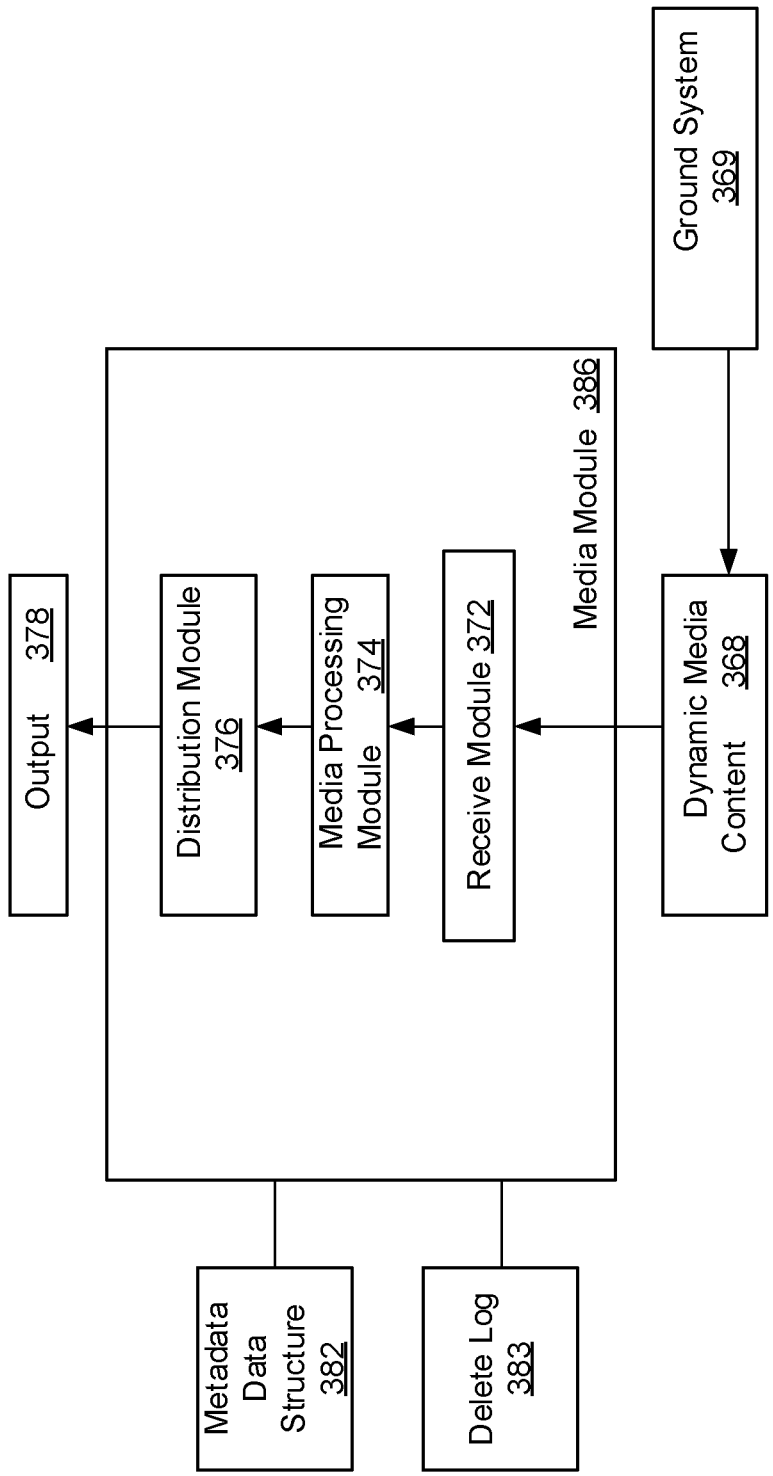
FIG. 3B shows a block diagram of a media module used for processing media content, according to one aspect of the present disclosure.

Media Module 386:

FIG. 3B shows an example of the media module 386 as used on an aircraft, according to one aspect of the present disclosure. The media module 386 receives media content 368 from a ground-based system 369. The ground based system may include one or more computing systems that provide the media content 368 to the aircraft. As an example, the media content 368 includes a media file and metadata associated with the media file. For example, the media content 368 metadata may include a time stamp when the media content is received, a time stamp of when the media content was generated, the size and type of media file, ownership information (e.g. licensor and licensee information), information indicating a type of encryption or encoding that may have been used to protect the media file, a part number, a version number, or any other parameter.

In one aspect media content 368 is generated by a content provider using a common user interface. For example, an airline is provided the common user interface by the ground based system 369 to define metadata for different media types, including audio, video, DVD or broadcast channel metadata.

In one aspect, the media content 368 is configured to operate as an independent media loadable unit (MPU) i.e. the media content 368 can be processed independently without relying on another MPU or sub-MPU. This is different from conventional MPUs where various media files are part of a "large" MPU that is loaded on a monthly basis.

In one aspect, the ground computing system 369 tracks the media content 368 that may be created for a specific airline or specific IFE system. The ground system 369 may also track storage usage on the aircraft for loading the media content 368, as described below in detail.

The media content 368 is received by a receive module 372 that temporarily stores the media content 368 on a temporary storage location, for example, on a buffer allocated for dynamic media content on the memory 350. In one aspect, media content 368 is first received by the communication interface 358 (FIG. 3A) that may use the Remote Direct Access Memory (RDMA) protocol to place the content in memory 350. Once the media content is temporarily stored, the media processing module 374 is notified.

The media processing module 374 dynamically generates a unique identifier for the media content 368. The unique identifier may be based on one or more of a time stamp of when the media content is received, a unique identifier of the aircraft (e.g. a tail identifier), a random number that is generated by a random number generator, an airline identifier or any other field. It is noteworthy that the media processing module 374 may include a random number generator or interfaces with a random generator to generate the random number for the unique identifier. Once the unique identifier is generated, the metadata for the media content 368 is updated on the data structure 382.

The media content 368 is persistently stored on storage 348 for streaming to seat devices and/or PEDs. The media content is stored with a flag indicating when the media content can be automatically deleted. In another aspect, the media content 368 may be stored on one or more seat device 326 or distributed among the seat devices by a distribution module 376. When the media content 368 is stored on one or more seat devices, then the data structure 382 or a portion of the data structure 382 is also stored on the one or more seat devices.

In one aspect, the distribution module 376 generates an output 378 that is sent to the seat devices 326. The output 378 includes the unique identifier for the media content 368 and indicates to the IFE layer 334 that media content is available for streaming. The unique identifier also indicates a location of where the media content is stored on the aircraft. In another aspect, output 378 includes the media content and the updated metadata with the unique identifier. Details regarding the use of media module 386 and processing of media content received while the aircraft is in flight is described below in detail.

In one aspect, media module 386 is configured to maintain a delete log 383 (may also be referred to as data structure 383) that tracks media content that is auto-deleted, based on an auto delete process of the present disclosure, described below in detail. In one aspect, the data structure 383 includes the unique identifier assigned by the media processing module 374 and other metadata of the deleted media content. The delete log 383 may be provided to the ground system 369 that tracks media loading for various aircraft and airlines.

Figure 4A:
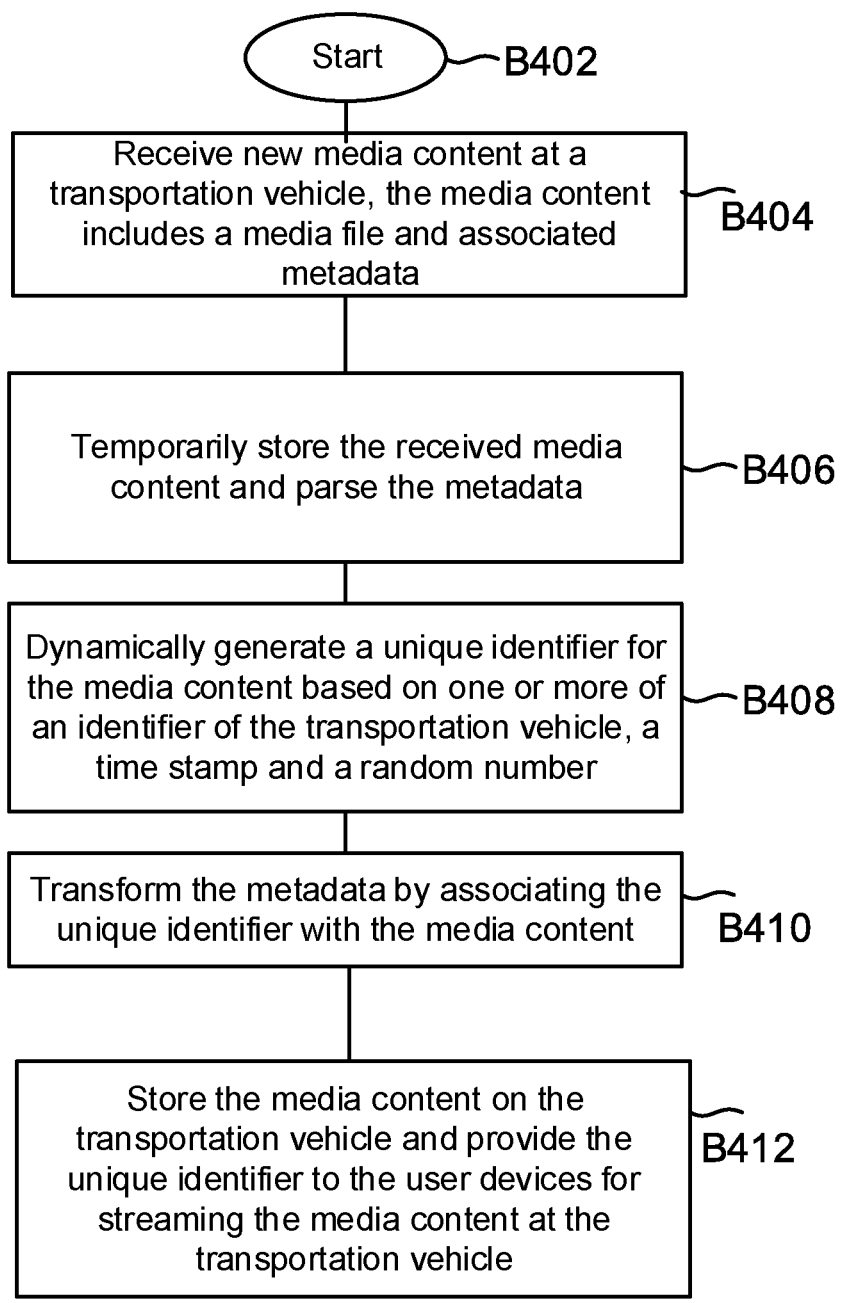
FIG. 4A shows a process flow diagram for generating a unique identifier for media content received on a transportation vehicle, according to one aspect of the present disclosure.

Process Flow:

FIG. 4A shows a process 400 according to one aspect of the present disclosure. The various adaptive aspects of process 420 are described below with respect to an aircraft but are equally applicable on any transportation vehicle. Process 400 begins in block B402 when an aircraft is mobile (e.g. in flight) or when the aircraft is outside of a scheduled media loading operation (for example, a monthly media loading operation that typically takes place once a month while the aircraft is on the ground).

In block B404, new media content 368 is received on the aircraft. The media content may be received via a satellite connect or any other type of wireless network connection. The media content 368 is transmitted to the aircraft by the ground system 369. As explained above, the media content 368 may be generated by any third party and uploaded using a common user interface provided by the ground system 369. The media content 368 is received by the communication interface 358 of server 354 for a system that uses a centralized server. In a server-less system, the media content 368 may be received by a networking device that forwards the media content to a computing device operating as a "master" device within a network of devices.

In block B406, the received media content 368 is temporarily buffered for processing. The memory buffers for storing the media content 368 may be directly accessible to the communication interface 358 i.e. the communication interface 358 may place the media content on the memory buffers and notify the media module 386 and/or or the system software 356 of the received media content. The media module 386 parses the metadata associated with the media content 368 to ascertain a start date when the media content can be streamed and an end date when streaming is to be terminated. It is noteworthy that this determination is only made when a media content provider includes that information either in the metadata or otherwise, when the media content is sent to the aircraft.

In block B408, the media processing module 374 dynamically generates a unique identifier for the media content 368. The unique identifier enables the aircraft system to control streaming of the media content to seat devices and/or PEDs, as well as to track usage of the media content on the aircraft. The unique identifier is based on one or more parameters, for example, an aircraft tail identifier (a unique identifier for identifying an aircraft), a timestamp indicating when the media content was received, the start date, the end date, airline identifier, an identifier indicating a class of a cabin (e.g. first class, business class, economy or others) or any other parameter. It is noteworthy that when the cabin class identifier is used to generate the unique identifier with the other fields' then more than one identifier is generated for the media content 368.

In block B410, the media module 374 transforms the received metadata with the unique identifier. The transformed metadata is then stored on data structure 382. Thereafter, in block B412, the media content is persistently stored on a storage device on the aircraft and the unique identifier is transmitted to the various seat devices such that the seat devices can select streaming the media content received in block B404. It is noteworthy that when the media content is the "latest" addition to a media library, then the media content may first be made available to the passengers that are located on premium aircraft seats. By using a cabin class identifier as one of the fields of the unique identifier, the distribution module 376 can easily select the unique identifiers that correspond to a particular cabin class for transmission.

Figure 4B:
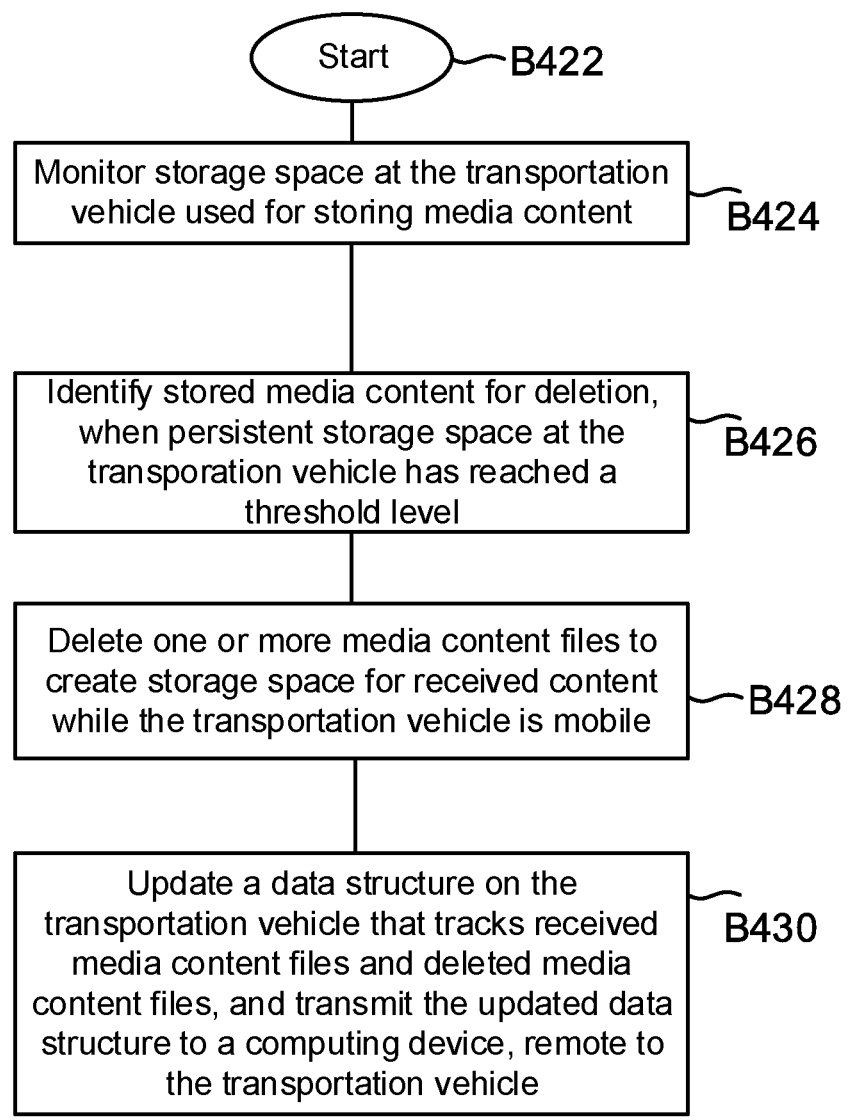
FIG. 4B shows a process flow diagram for managing storage space for media content on a transportation vehicle, according to one aspect of the present disclosure.

FIG. 4B shows a process 420 for managing storage space on a transportation vehicle for storing media content, according to one aspect of the present disclosure. The various adaptive aspects of process 420 are described with respect to an aircraft but are equally applicable on any transportation vehicle. Process 420 begins in block B422 after media content 368 has been received, processed and persistently stored on the aircraft.

In block B424, the storage space on the aircraft is monitored. In one aspect this includes monitoring storage capacity of storage device 348 by system software 356 (or any other storage utility application). When media content is distributed among the seat devices, then storage usage of storage device 342 is monitored by firmware of the seat device (not shown), the IFE layer 334 or any other processor executable application/utility. In one aspect, storage capacity usage is transmitted to the ground system 369 on a regular basis.

In block B426, the process determines that storage capacity has reached a configurable threshold value. The configurable threshold size varies based on the type of aircraft, aircraft route, storage capacity on the aircraft, the type of media content that is persistently stored or any other parameter. Thereafter, media module 386 identifies the media content that may be candidates for deletion. The identification may be based on one or more parameters, e.g. the end date for the media content indicated by a flag in data structure 382, the frequency of how often media content is viewed, or any other factor. System software 356 and/or media module 386 may examine the data structures 382 and 320 to identify the media content for automatic deletion.

In block B428, the identified files are automatically deleted. In block B430, data structure 383 is updated. The updated data structure 383 is transmitted to the ground based system 369 that tracks media content that is provided to a specific aircraft.

Since storage space on the aircraft is limited, the media content is configured to be automatically deleted when the storage capacity reaches the configurable threshold size. This efficiently maintains storage space without manual intervention.

Figure 4C:
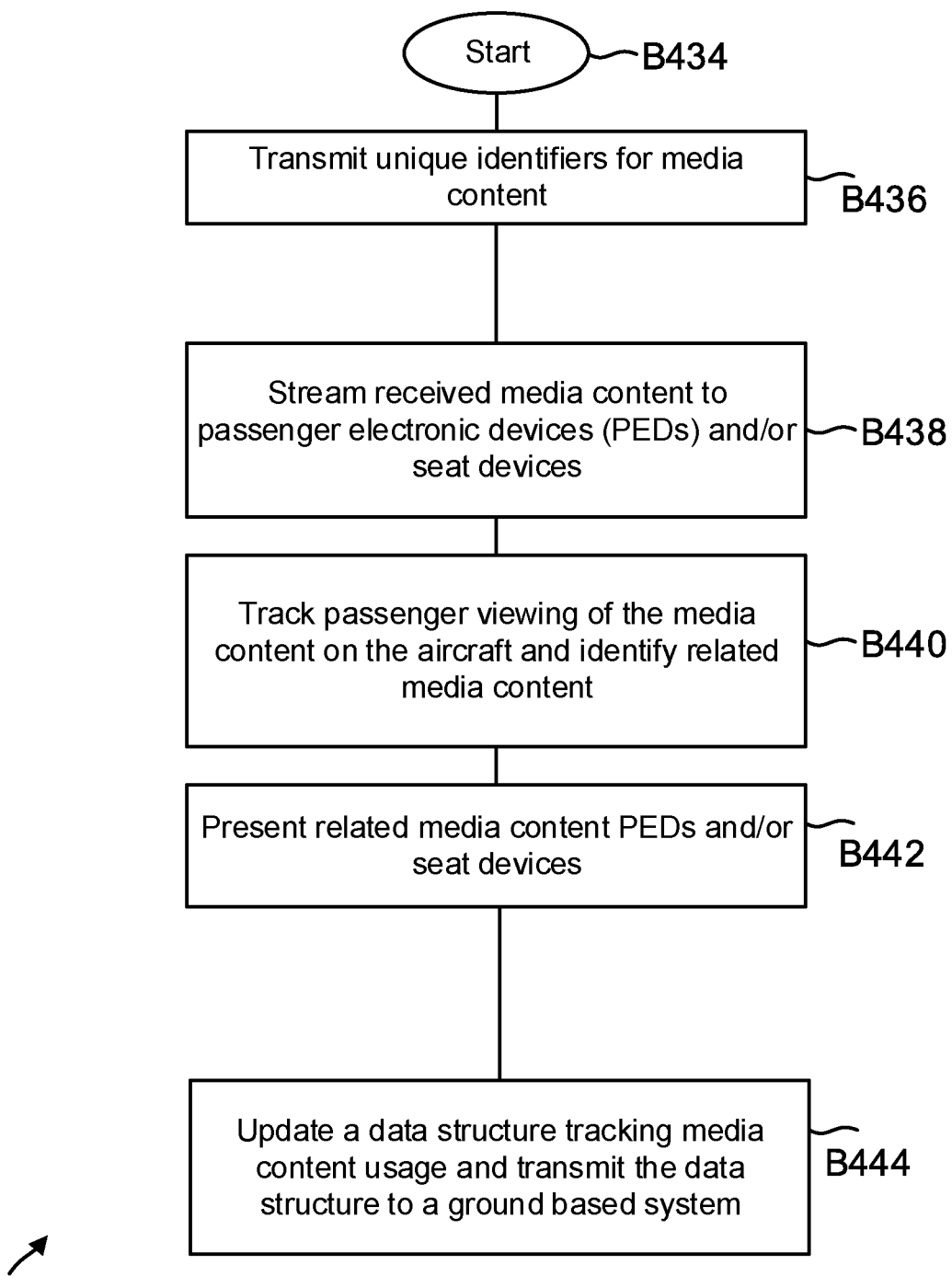
FIG. 4C shows a process flow diagram for tracking usage of media content on an aircraft, according to one aspect of the present disclosure.

FIG. 4C shows a process 432 for streaming and tracking usage of media content 368, according to one aspect of the present disclosure. The various adaptive aspects of process 420 are described with respect to an aircraft but are equally applicable on any transportation vehicle. Process 432 begins in block B434 when media content 368 has been received and stored on the aircraft.

In block B436, the distribution module 376 transmits the unique identifiers of media content that is received while an aircraft is in flight or outside its planned media loading schedule. The unique identifiers are provided to the PEDs and/or seat devices. The unique identifiers may be used to indicate locations of where the media content associated with the unique identifiers are stored on the aircraft.

In block B438, the media content associated with one or more unique identifier is streamed to a PED and/or seat device. The passenger usage or viewing of the media content is tracked. In one aspect, the IFE layer 334 tracks the duration when the media content is being viewed, the number of times a passenger streams the media content, the type of passenger (i.e. seated in first class or economy), the demographics of the passenger (age, or any other information) streaming the media content or any other related parameter. The usage is stored in data structure 320. In one aspect, the media module 386 identifies media content that may be similar to the media content viewed by the passenger. The related content is presented in block B442. Based on the passenger interaction of the related content, data structure 320 is updated. The updated data structure is provided to the ground system 369 in block B444. The ground system 369 uses machine learning to consolidate data structure 320 from different aircraft for identifying or updating relevant content associated with media content that is made available on the aircraft. Thereafter, the process ends.

In one aspect, methods and systems are provided for a transportation vehicle. One method includes receiving media content on a transportation vehicle while the transportation vehicle is mobile, the media content including a media file and metadata associated with the media file, the metadata indicating a media file type and media content size; parsing the metadata by a processor on the transportation vehicle to ascertain a start date when the media content can be presented to a device on the transportation vehicle and an end date when media content is to become inaccessible; dynamically generating a unique identifier for the media content by the processor, the unique identifier based on at least one of an identifier of the transportation vehicle, a random number and a timestamp indicating when the media content was received by the transportation vehicle; using the unique identifier by the processor to transform the metadata; storing the media content with the transformed metadata on a storage device on the transportation vehicle, the stored media content using an indicator to indicate when the media content is to be deleted; using the unique identifier by the processor for tracking usage of the media content on the transportation vehicle; automatically deleting by the processor, the media content from the storage device based on the unique identifier and the indicator; and updating a data structure by the processor to indicate that the media content has been deleted.

In another aspect, another method includes parsing by a processor on an aircraft, metadata of media content received by the aircraft, while the aircraft is in flight, the media content includes a media file and the metadata. The metadata indicates a start date when the media content can be presented to a device on the aircraft and an end date when media content is to become inaccessible. The method further includes dynamically generating a unique identifier for the media content by the processor, the unique identifier based on an aircraft identifier; updating the metadata by the processor by associating the unique identifier with the media content; storing by the processor, on a storage device on the aircraft, the media content with the updated metadata and an indicator when the media content is to be deleted; and using the unique identifier by the processor for tracking usage of the media content on the aircraft.

Figure 5:
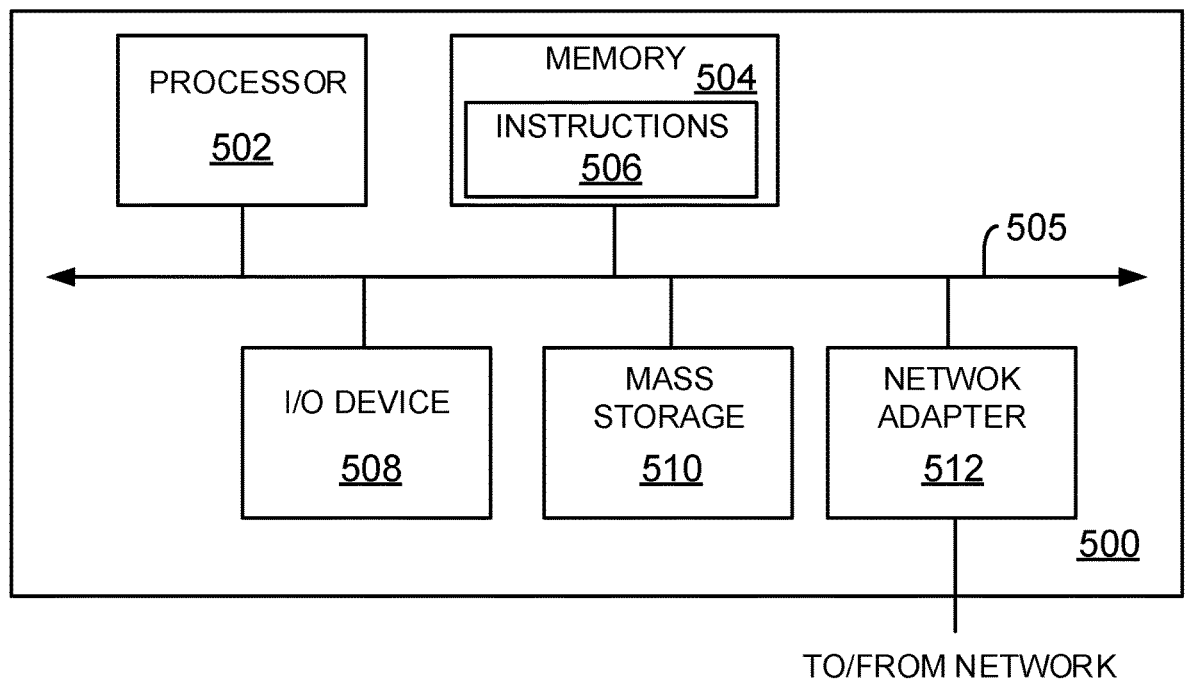
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent a ground system 369, CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement module 386, application 314, data structures 320 and 382 and/or the process steps of FIGS. 4A-4C described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for dynamically loading and processing media content on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

receiving media content by a transportation vehicle while the transportation vehicle is mobile, the media content including a media file and metadata associated with the media file, the metadata indicating a media file type and media content size;

parsing the metadata by a processor on the transportation vehicle to ascertain a start date when the media content can be presented to a device on the transportation vehicle and an end date when the media content is to become inaccessible;

dynamically generating on the transportation vehicle, upon receiving the media content and parsing the metadata, a unique identifier for the media content by the processor, the unique identifier based on an identifier of the transportation vehicle, a random number and a timestamp indicating when the media content was received by the transportation vehicle;

using the unique identifier by the processor to transform the metadata;

storing the media content with the transformed metadata on a storage device on the transportation vehicle, the stored media content using an indicator to indicate when the media content is to be deleted, based on the end date;

transmitting, by the processor, the unique identifier to a plurality of devices on the transportation vehicle indicating that the media content associated with the unique identifier is available for streaming on the transportation vehicle;

using the unique identifier by the processor for tracking usage of the media content by the plurality of devices on the transportation vehicle;

automatically deleting by the processor, the media content from the storage device based on the unique identifier, the tracked usage and the indicator; and updating a data structure by the processor to indicate that the media content has been deleted.

2. The method of claim 1, further comprising: tracking, by the processor, storage capacity usage on the transportation vehicle and deleting, by the processor, the media content to increase available storage space for other media content.

3. The method of claim 1, wherein an entertainment system on the transportation vehicle tracks usage of the media content by a user for presenting content related to the media content.

4. The method of claim 1, wherein the transportation vehicle is an aircraft and the media content is received in-flight via a satellite connection.

5. The method of claim 4, further comprising: transmitting, by the processor, the updated data structure to a ground based server system to track live media content provided to a plurality of aircrafts.

6. The method of claim 1, further comprising: providing, by the processor, the unique identifier to a seat device of the transportation vehicle to indicate a storage location of the media content to the seat device.

7. The method of claim 1, wherein the transportation vehicle is one of a bus, a train, a recreational vehicle and a ship.

8. A non-transitory machine readable medium having stored thereon instructions for performing a method comprising machine executable code which when executed by at least one machine, causes the machine to:

receive media content by a transportation vehicle while the transportation vehicle is mobile, the media content including a media file and metadata associated with the media file, the metadata indicating a media file type and media content size;

parse the metadata to ascertain a start date when the media content can be presented to a device on the transportation vehicle and an end date when media content is to become inaccessible;

dynamically generate on the transportation vehicle upon receiving the media content and parsing the metadata, a unique identifier for the media content, the unique identifier based on an identifier of the transportation vehicle, a random number and a timestamp indicating when the media content was received by the transportation vehicle;

use the unique identifier to transform the metadata;

store the media content with the transformed metadata on a storage device on the transportation vehicle, the stored media content using an indicator to indicate when the media content is to be deleted, based on the end date;

transmit the unique identifier to a plurality of devices on the transportation vehicle indicating that the media content associated with the unique identifier is available for streaming on the transportation vehicle;

use the unique identifier for tracking usage of the media content on the transportation vehicle by the plurality of devices;

automatically delete the media content from the storage device based on the unique identifier, the tracked usage and the indicator; and update a data structure to indicate that the media content has been deleted.

9. The non-transitory machine readable medium of claim 8, wherein storage capacity usage is tracked on the transportation vehicle and the media content is deleted to increase available storage space for other media content.

10. The non-transitory machine readable medium of claim 8, wherein an entertainment system on the transportation vehicle tracks usage of the media content by a user for presenting content related to the media content.

11. The non-transitory machine readable medium of claim 8, wherein the transportation vehicle is an aircraft and the media content is received in-flight via a satellite connection.

12. The non-transitory machine readable medium of claim 11, wherein the updated data structure is transmitted to a ground based server system to track live media content provided to a plurality of aircraft.

13. The non-transitory machine readable medium of claim 8, wherein the unique identifier is provided to a seat device of the transportation vehicle and the unique identifier indicates a storage location of the media content to the seat device.

14. The non-transitory machine readable medium of claim 8, wherein the transportation vehicle is one of a bus, a train, a recreational vehicle and a ship.

15. A system comprising:
a memory containing machine readable medium comprising machine executable code having stored thereon instructions; and a processor on a transportation vehicle coupled to the memory, the processor configured to execute the machine executable code to:

receive media content by the transportation vehicle while the transportation vehicle is mobile, the media content including a media file and metadata associated with the media file, the metadata indicating a media file type and media content size;

parse the metadata to ascertain a start date when the media content can be presented to a device on the transportation vehicle and an end date when media content is to become inaccessible;

dynamically generate on the transportation vehicle upon receiving the media content and parsing the metadata, a unique identifier for the media content, the unique identifier based on an identifier of the transportation vehicle, a random number and a timestamp indicating when the media content was received by the transportation vehicle;

use the unique identifier to transform the metadata;

store the media content with the transformed metadata on a storage device on the transportation vehicle, the stored media content using an indicator to indicate when the media content is to be deleted, based on the end date;

transmit the unique identifier to a plurality of devices on the transportation vehicle indicating that the media content associated with the unique identifier is available for streaming on the transportation vehicle;

use the unique identifier for tracking usage of the media content on the transportation vehicle by the plurality of devices;

automatically delete the media content from the storage device based on the unique identifier, the tracked usage and the indicator; and update a data structure to indicate that the media content has been deleted.

16. The system of claim 15, wherein storage capacity usage is tracked on the transportation vehicle and the media content is deleted to increase available storage space for other media content.

17. The system of claim 15, wherein an entertainment system on the transportation vehicle tracks usage of the media content by a user for presenting content related to the media content.

18. The system of claim 15, wherein the transportation vehicle is an aircraft and the media content is received in-flight via a satellite connection.

19. The system of claim 18, wherein the updated data structure is transmitted to a ground based server system to track live media content provided to a plurality of aircraft.

20. The system of claim 15, wherein the unique identifier is provided to a seat device of the transportation vehicle and the unique identifier indicates a storage location of the media content to the seat device.

* * * * *